United States Patent [19]

Foley

[11] 4,288,663

[45] Sep. 8, 1981

[54] NOISE CANCELING TRANSMITTER

[75] Inventor: James P. Foley, Astoria, N.Y.

[73] Assignee: Roanwell Corporation, New York, N.Y.

[21] Appl. No.: 127,324

[22] Filed: Mar. 5, 1980

[51] Int. Cl.³ .................. H04M 1/19; H04R 21/02
[52] U.S. Cl. .................. 179/122; 179/1 P; 179/187
[58] Field of Search .......... 179/187, 1 P, 179, 121 R, 179/122, 124, 125, 127

[56] References Cited

U.S. PATENT DOCUMENTS

| 2,483,317 | 9/1949 | Laurent | 179/122 |
| 2,748,882 | 6/1956 | Skelton | 179/179 X |
| 3,830,988 | 8/1974 | Mol et al. | 179/187 |

*Primary Examiner*—Thomas W. Brown

*Attorney, Agent, or Firm*—Cooper, Dunham, Clark, Griffin & Moran

[57] ABSTRACT

This transmitter is designed for installation in a telephone handset to replace a standard carbon transmitter, for the purpose of excluding the ambient noise from the telephone lines, so that only the voice of the speaker is transmitted. This transmitter is designed to be installed by a person unskilled in the telephone art. The orientation of this transmitter with respect to the handset structure is critical and is indicated to the person inserting it by markings on the face of the transmitter housing, together with appropriate instructions. This transmitter is of the carbon type, and has improved electrical connections between internal contacts which engage the carbon and external contacts which engage conductors in the handset housing.

6 Claims, 8 Drawing Figures

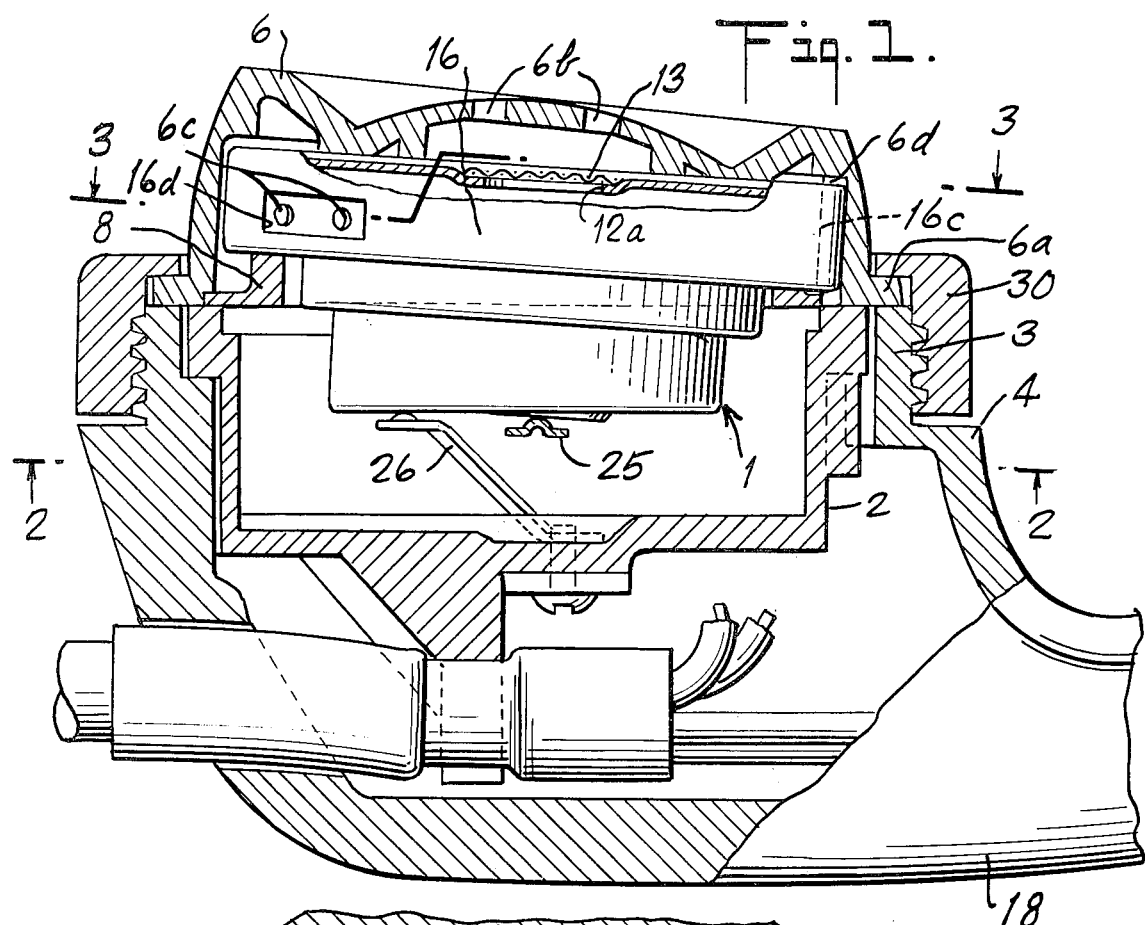
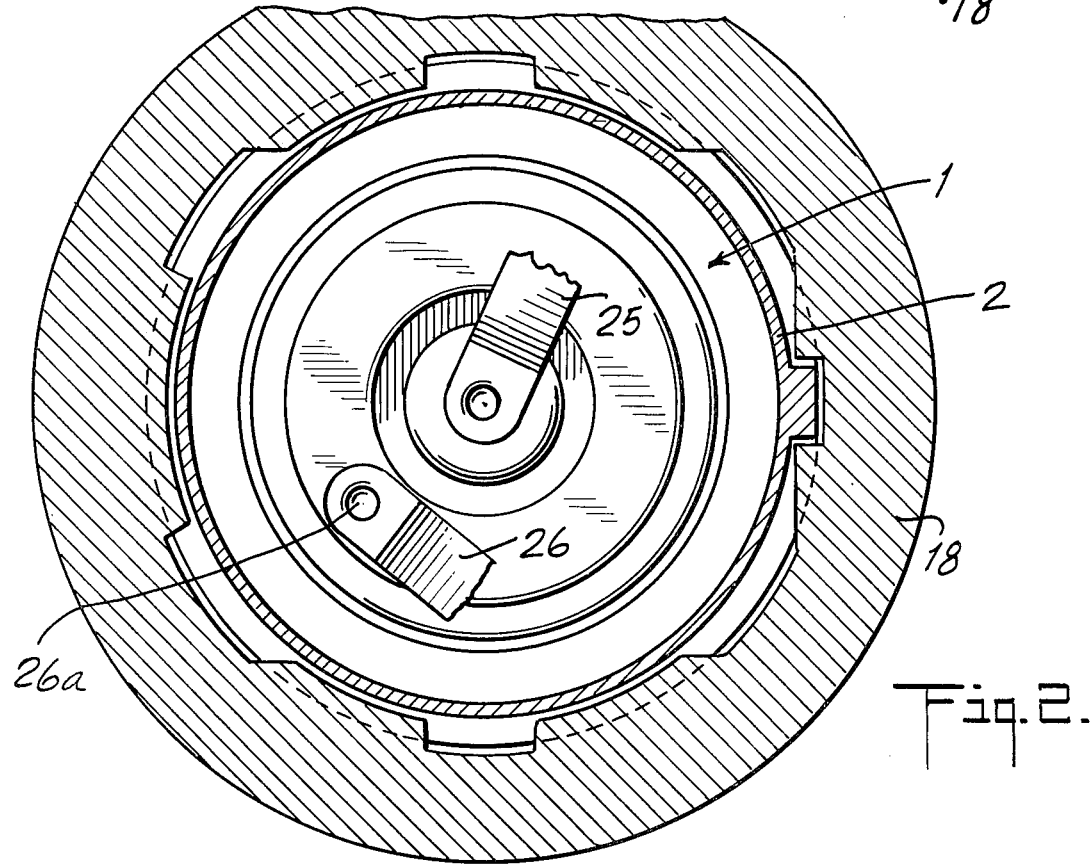

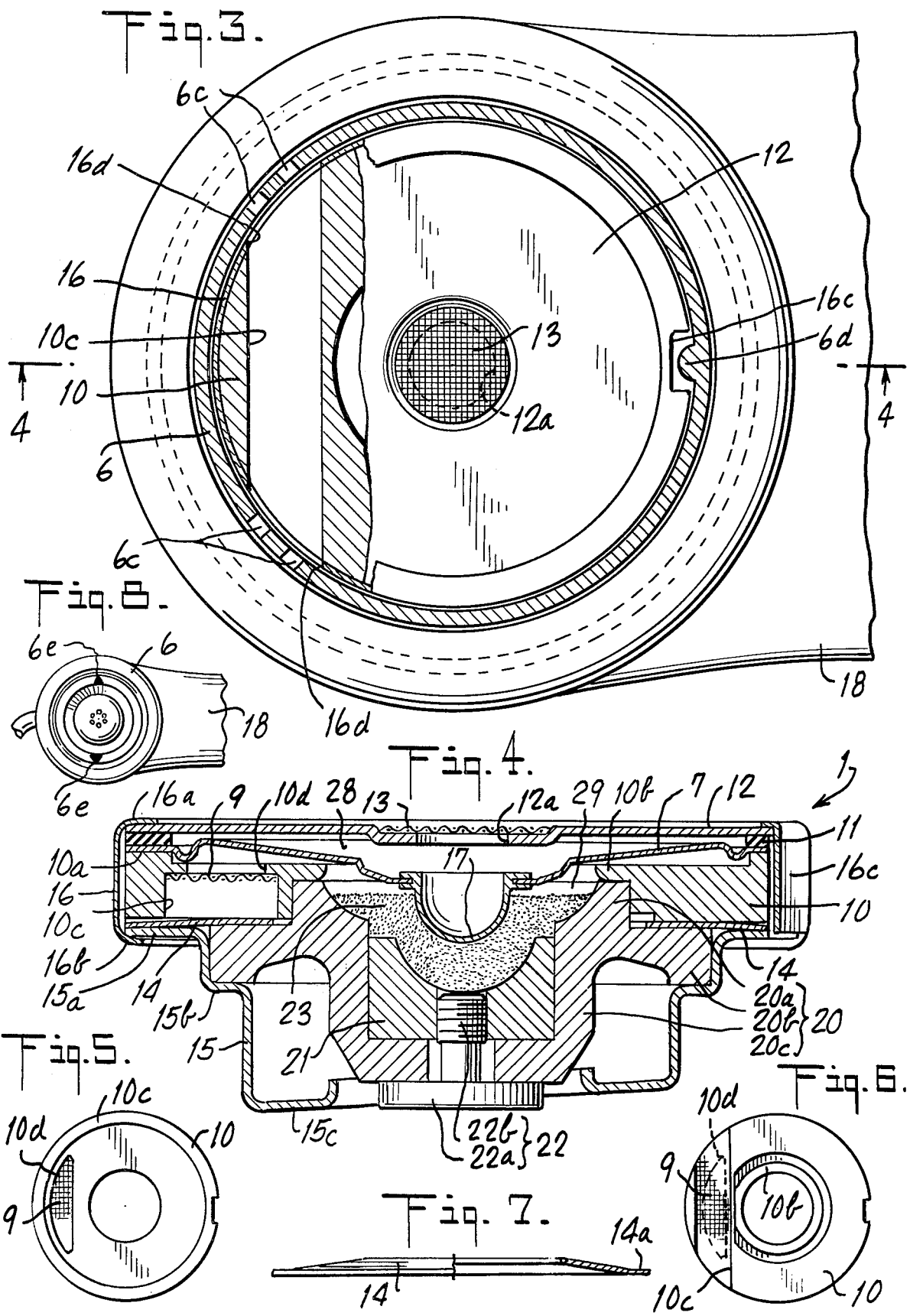

NOISE CANCELING TRANSMITTER

CROSS-REFERENCE

This invention is an improvement on the transmitter shown in the patent to Mol et al, U.S. Pat. No. 3,830,988, dated Aug. 20, 1974 and assigned to the assignee of the present application.

BRIEF SUMMARY OF THE INVENTION

The transmitter includes a diaphragm supported so as to be free to vibrate in response to acoustic waves. The diaphragm is subjected on one side to sound waves both from the person using the transmitter and from external noise. The opposite side of the diaphragm is subjected substantially only to sound from the external noise, so that the noise effects act in opposition on the two sides of the diaphragm. The noise effects therefore cancel, and the diaphragm vibrates substantially only in response to the speaker's voice.

The internal contacts which engage the granular car in the transmitter have low contact resistance surfaces, e.g., gold plating. The electrical connections between the diaphragm and the external contacts are simplified.

DRAWINGS

FIG. 1 is a cross-sectional view of a transmitter embodying the invention, mounted in a conventional handset.

FIG. 2 is a cross-sectional view on the line 2—2 of FIG. 1.

FIG. 3 is a cross-sectional view taken on the line 3—3 of FIG. 1, with certain parts broken away.

FIG. 4 is a cross-sectional view taken on the line 4—4 of FIG. 3, with certain parts broken away.

FIG. 5 is a plan view, on a reduced scale, of an annular electrically conductive member forming part of the transmitter of FIG. 4.

FIG. 6 is a bottom plan view of the annular member of FIG. 5.

FIG. 7 is a view, partly in elevation and partly in section, showing the unstressed contour of a spring used in the transmitter.

FIG. 8 is a plan view of the transmitter of FIG. 1, on a reduced scale, showing the orientation indicating marks.

DETAILED DESCRIPTION

FIGS. 1 and 2 show the transmitter end of a telephone handset 18 including a transmitter assembly generally indicated at 1, and shown in detail in FIGS. 4-7. The handset includes a contact supporting cup 2 received within a peripheral flange 3 of handset 18. Flange 3 is threaded on its outer surface and terminates at its lower end at a shoulder 4.

The transmitter assembly 1 has its axis tilted with respect to the axis of the cup 2, and its upper side enclosed by a housing cover 6 whose axis is similarly tilted. The cover 6 has a tilted peripheral flange 6a which is adapted to rest against the lip of the cup 2 and the top of the flange 3 on the headset. The housing cover 6 is provided with central apertures 6b through which sound waves may pass from the person speaking to the transmitter 1. The housing cover 6 is also provided with side apertures 6c (FIGS. 1 and 3) through which ambient noise may reach a lower chamber 29 under a diaphragm 7.

The cover 6 is held in place on the headset 18 by a threaded ring 30 having on its upper end an internally projecting flange which engages the flange 6a on the cover 6 and holds it in place against the upper end of flange 3. The threads on the ring 30 engage the threads on the outside of the flange 3.

The transmitter assembly is tilted so as to bring the apertures 6b in the housing cover 6 closer to the mouth of the person speaking into the transmitter and to locate the surface of that cover more nearly at right angles to the sound waves issuing from the speaker's mouth, when the handset is held in its usual position. Furthermore, the side apertures 6c are, by the tilt of the transmitter cover, directed outwardly away from the speaker's mouth so as to diminish the intensity of the acoustic waves from the speaker's voice entering those apertures 6c.

The transmitter assembly 1 is partly enclosed by the plastic housing cover 6, and rests upon a plastic base ring 8, which is fastened to the cover 6, as by bonding or welding. The base ring 8 rests on the rim of the cup 2, and is higher on one side than on the other so as to tilt the transmitter assembly 1 to the required angle. The cover 6 is made similarly asymmetrical and the higher side of the cover 6 is aligned with the higher side of the base ring 8.

The transmitter assembly 1 is shown in detail in FIG. 4 and includes the circular diaphragm 7 having its periphery clamped between an annular conductive member 10 and an insulating ring 11 which separates the diaphragm 7 from a grid 12. The grid 12 has a central aperture 12a covered by an acoustic resistance screen 13, through which sound waves may impinge on the upper side of the diaphragm 7, as viewed in FIG. 4. An annular spring 14 is located under the annular member 10, with its inner periphery in engagement with that annular member. The outer periphery of the spring 14 abuts the upper side of a flange 15a on an external annular contact 15. An annular frame 16 encircles the assembly including the diaphragm 7, grid 12, annular member 10, spring 14 and contact 15. The annular frame 16 has a preformed upper flange 16a against which the upper member of the stacked assembly is held. A lower flange 16b is rolled over against the lower member of the stack and cooperates with flange 16a to hold the assembly clamped together in a stacked relationship which is resiliently maintained tight by compression of the spring 14.

The spring 14, when unstressed, has a flat peripheral portion 14a (FIG. 7) which engages the flange 15a of the external contact 15 in a surface contact. The spring 14 inside the peripheral surface 14a, when unstressed, is of frusto-conical configuration. The inner edge of the spring 14 is clamped tightly between the insulator 20 and the annular conductive member 10.

The diaphragm 7 is supported between an upper chamber 28, defined by the grid 12, the insulating ring 11, and the diaphragm 7, and a lower chamber 29, defined by conductive member 10, an insulator 20, a contact 21, and the diaphragm 7. The upper chamber receives acoustic waves through the apertures 6b and screen 13. These waves include both the voice of the person using the transmitter and the ambient noise. The lower chamber receives acoustic waves through the side apertures 6c, openings 16d, a channel 10c and a screened opening 10d, which waves include substantially only the ambient noise. Thus, the ambient noise waves act on both sides of the diaphragm and their effects cancel.

The diaphragm 7 carries at its center an internal movable contact 17, which is generally cup-shaped, and has a low contact resistance surface, e.g., gold plating. Its lower surface is in contact with a mass 23 of granular carbon. Below the annular member 10 is located the insulator 20. The insulator 20 is annular and has a flange 20a extending upwardly as seen in FIG. 4, which abuts against the radially inwardly extending flange 10b on the annular conductive member 10. The annular insulator 20 also has a peripheral flange 20b, which underlies the inner periphery of the frusto-conical spring 14, and a cup-shaped central part 20c which extends axially of the transmitter assembly 1 in the opposite direction from the flange 20a.

Contact 21 is an internal stationary contact received in the cup-shaped portion 20c of the annular insulator 20. The internal contact 21 is of metal, e.g., brass, and its surface is of low contact resistance, e.g., gold plating, where it engages the mass 23 of granular carbon.

A central external contact 22 includes a head 22a and a shank 22b which is threaded into a central aperture in the internal stationary contact 21. The head 22a is adapted to be engaged by a central contact 25 (FIGS. 1 and 2) fixed in the handset 18. The head 22a may be provided with suitable configuration such as a screw slot or a hexagonal periphery, to facilitate the threading of shank 22b into the contact 21. However, it is presently preferred to make the head 22b flat to facilitate its electrical contact with the fixed contact 25, and to rely upon other means to thread the shank 22b into the internal contact 21.

The annular external contact 15 includes (a) the peripheral flange 15a, which engages the spring 14 and which is held by the flange 16b on the frame 16; (b) an intermediate shoulder 15b which engages the under side of the flange 20b on the insulator 20; and (c) an annular surface 15c at its lower end, which surface is one of the external contacts and which engages a fixed contact 26 (FIGS. 1 and 2) mounted in the cup 2. The contact surface 15c is tilted with respect to the axis of the transmitter assembly 1 so that that surface is parallel with the bottom of the cup 2 supporting the contact 26. The contact 26 is a spring finger having a contact tip 26a located at a fixed radius from the axis of the transmitter assembly. By making the surface 15c parallel to the bottom of the cup 2, the deflection of the contact 26 is made the same regardless of the angular orientation of the tip 26a with respect to the axis of the transmitter 1.

The annular frame 16 has an indented notch 16c in its periphery (see FIGS. 1, 3 and 4), which appears internally as a projecting ridge. The ridge 16c engages corresponding notches in the grid 12, ring 11, diaphragm 7, annular member 10, spring 14 and contact 15 and maintains all those members aligned in a fixed orientation. The notch in member 10 is necessary to maintain channel 10c aligned with the openings 16d in the frame 16. The notch in contact 15 maintains the annular external contact 15c parallel to the bottom of cup 2. The other parts are notched simply to accommodate the ridge 16c in the frame 16. The outer cover 6 is provided with an internal ridge 6d (FIG. 3) which cooperates with the notch 16c and holds the transmitter assembly 1 properly aligned with the cover 6 so as to keep the channel 10c aligned with the noise-canceling openings 6c. It also assists in keeping the external contact surface 15c parallel to the bottom of the cup 2, as mentioned above. The outer cover 6 is provided on its outer face with suitable indicia such as a pair of arrowheads 6e (FIG. 8) to indicate to the person installing the transmitter assembly in the handset the proper orientation of the transmitter assembly with respect to the handset 18. These arrowheads 6e or other suitable indicia do not by themselves indicate the proper orientation. The transmitter assembly must be accompanied by appropriate instructions to the person making the installation, as to the proper orientation of the arrowheads 6e with respect to the handset 18. In the arrangement illustrated in FIG. 8, the arrowheads 6e are aligned along a line at right angles to the long axis of the handset 18. However, other arrangements could be used, for example, the arrowheads might be aligned with that long axis rather than along a line at right angles to it.

I claim:
1. A noise canceling transmitter comprising:
    a. a circular diaphragm (7) of electrically conductive material;
    b. a circular grid (12) insulatingly spaced from one surface of the diaphragm and having a central aperture (12a) through which sound waves may impinge on said one surface;
    c. means (10,20,21) defining a chamber (29) on the opposite side of the diaphragm from said one surface, said means including an annular member (10) of electrically conductive material having a radially inwardly projecting flange (10b) adjacent said chamber and a peripheral rim (10a) supporting the rim only of said opposite side of the diaphragm so that the diaphragm is free to vibrate;
    d. an annular frame (16) encircling the diaphragm and the annular member and having peripheral apertures (16d) therein, said annular member having a passage (10c) providing acoustic communication between said peripheral apertures and said chamber, so that ambient noise passing through the cover aperture (12a) and the frame apertures (16d) reaches both sides of the diaphragm and the vibratory effects of the noise on the diaphragm substantially cancel;
    e. an internal movable contact (17) fixed on the center of the diaphragm;
    f. an internal stationary contact (21) in said chamber opposite said movable contact;
    g. a mass (23) of granular carbon enclosed in the chamber (29) between the internal contacts and subject to varying compression as the diaphragm vibrates;
    h. an external annular contact (15) electrically connected (14,10,7) to the internal movable contact;
    i. an external central contact (22a) within and spaced from the annular contact (15) and electrically connected to the internal stationary contact;
wherein the improvement comprises:
    j. an annular insulator (20) in said means including an internal flange (20a) projecting axially toward the diaphragm and engaging the flange on the annular member, a peripheral flange (20b) adjacent said annular member, and a cup (20c) extending axially in the opposite direction from the internal flange and receiving said stationary contact, said cup being open toward said chamber and receiving the internal stationary contact, the end of the cup remote from the chamber having a central opening for receiving the external central contact.

2. A noise canceling transmitter as in claim 1, in which:
   a. said external annular contact (15) has a peripheral shoulder (15a) facing said annular member; and
   b. the electrical connection of said external annular contact to the internal movable contact includes an annular spring (14) having an outer periphery abutting said peripheral shoulder on the external contact member and an inner periphery abutting said annular member.

3. A noise canceling transmitter as in claim 2, in which:
   a. said frame has flanges 16a, 16b) engaging said cover and the outer side of the peripheral shoulder on the annular contact member, said frame and its flanges being effective to hold said grid, said diaphragm, said annular member, said annular insulator, said spring and said external annular contact stacked together with said spring compressed;
   b. said diaphragm, said annular member, and said spring completing the electrical connection between said internal movable contact and said external annular contact.

4. A noise canceling transmitter as in claim 1, in which:
   a. said internal stationary contact is fixed in the cup of said annular insulator and has a threaded axial aperture.

5. A noise canceling transmitter as in claim 4, in which said external central contact comprises a screw (22) extending through the central opening in the cup and having a shank (22b) threaded into the aperture in said internal stationary contact and an electrically conductive head (22a) projecting externally of the cup.

6. A noise canceling transmitter as in claim 1, in which:
   a. said internal movable contact (17) is a metallic button of a diameter substantially smaller than the diaphragm and having a low contact resistance surface facing said chamber; and
   b. said internal stationary contact has a low contact resistance surface facing the chamber.

* * * * *